United States Patent Office 3,433,869
Patented Mar. 18, 1969

3,433,869
PROCESS FOR TREATING FATIGUE WITH
CALCIUM GLUCOSE-1-PHOSPHATE
Roger Brule, Fontenay-sous-Bois, France, assignor to
Roussel-UCLAF, Paris, France, a corporation of France
No Drawing. Original application July 3, 1964, Ser. No.
380,122. Divided and this application July 13, 1966,
Ser. No. 574,519
Claims priority, application France, July 9, 1963,
940,884
U.S. Cl. 424—180 3 Claims
Int. Cl. A61k 27/00

ABSTRACT OF THE DISCLOSURE

A novel salt, calcium glucose-1-phosphate having the formula

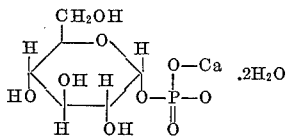

although the number of water crystallization molecules may vary depending upon the precipitation or crystallization conditions. The invention further relates to novel processes for the preparation of the said calcium salt and to novel compositions for increasing resistance to fatigue. The invention also relates to a method of increasing the resistance of warm-blooded animals to fatigue.

PRIOR APPLICATIONS

The present application is a divisional application of my copending, commonly assigned U.S. patent application Ser. No. 380,122, filed July 3, 1964, now abandoned.

PRIOR ART

Calcium glucose-1-phosphate possesses interesting pharmacological properties, particularly increasing the resistance of warm-blooded animals to fatigue.

Calcium glucose-1-phosphate represents an improvement over known compounds such as glycero phosphates for simultaneous administration of phosphorus and calcium to warm-blooded animals. The said salt can be considered as acting as a natural substance due to the role of the glucose-1-phosphoric acid ion in glucidic metabolism. The said salt has the further advantage of having a high degree of solubility practically independent of pH and is, therefore, efficiently assimilated by digestive means.

OBJECTS OF THE INVENTION

It is an object of the invention to provide the novel compound, calcium glucose-1-phosphate.

It is another object of the invention to provide novel processes for the preparation of calcium glucose-1-phosphate.

It is a further object of the invention to provide novel compositions for increasing resistance to fatigue.

It is an additional object of the invention to provide a novel method of increasing the resistance of warm-blooded animals to fatigue.

These and other objects and advantages of the invention will become obvious from the following detailed description.

THE INVENTION

The novel salt of the invention is calcium glucose-1-phosphate which is the calcium salt of the monoester formed by an acid portion of phosphoric acid and the free hydroxy group in the 1-position of glucose in the form of α-d-glucopyranose. The number of molecules of water of crystallization can vary depending upon the method of crystal formation.

The process of the invention for the preparation of calcium glucose-1-phosphate comprises essentially in neutralizing glucose-1-phosphoric acid with calcium hydroxide preferably in an aqueous media and isolating the formed calcium salt by known procedures, such as precipitation by the addition of a water-miscible solvent such as alcohol to the aqueous reaction solution, by lyophilization or by concentration of the aqueous solution to effect crystallization.

A variation of the said process is effecting double decomposition of a salt of glucose-1-phosphoric acid such as an alkali metal salt, ammonium salt or an alkaline earth metal salt other than calcium with a water-soluble calcium salt such as calcium chloride and then recovering calcium glucose-1-phosphate.

Another variant of the process comprises passing an aqueous solution of potassium glucose-1-phosphate through a cation exchange resin to absorb glucose-1-phosphoric acid thereon, eluting glucose-1-phosphoric acid with ammonia to form an aqueous solution of ammonium glucose-1-phosphate and reacting the said salt with a water-soluble calcium salt such as calcium chloride to form calcium glucose-1-phosphate.

The compositions of the invention for increasing resistance to fatigue are comprised of calcium glucose-1-phosphate and a major amount of a pharmaceutical carrier. The compositions may be in the form of aqueous solutions for drinking or injection, in ampules, pills, coated pills, tablets, cachets, aromatic powders, pellets, syrups or suppositories.

The method of the invention for increasing the resistance of warm-blooded animals to fatigue comprises administering an effective amount of calcium glucose-1-phosphate to the animals. The said calcium salt may be administered orally, transcutaneously or rectally. The usual individual oral dose is about 0.50 gm. and the usual daily does is between 1 gm. to 2.5 gm. per day depending upon the method of administration.

In the following examples there are described several preferred embodiments to illustrate the invention. However, it should be understood that the invention is not intended to be limited to the specific embodiments.

Example I.—Preparation of calcium glucose-1-phosphate from the free acid

An aqueous solution containing 10 gm. of glucose-1-phosphoric acid was prepared in 100 cc. and while controlling the pH with the aid of a pH-meter, calcium hydroxide was introduced dropwise into the said solution under agitation until neutralization was complete. This point was attained after the introduction of the stoichiometric amount of calcium hydroxide. Two volumes of ethanol were added to the neutral solution of the resulting calcium salt and the mixture was left standing for a period of 24 hours. The precipitate formed was vacuum filtered, washed in ethanol and vacuum dried to obtain calcium glucose-1-phosphate with a specific rotation $[\alpha]_D^{20} = +78°$ (c.=4% in water), which occurred in the form of a white or cream-colored, microcrystalline or amorphous powder. The salt was insoluble in ethanol and most of the common organic solvents and soluble in water.

In a pure solution, calcium glucose-1-phosphate exhibited all the conventional reactions of the calcium ion: white precipitate of calcium carbonate upon the addition of alkali carbonates, white precipitate of calcium sulfate upon the addition of sulfuric acid and soluble sulfates, white precipitate of calcium oxalate which was insoluble in acetic acid and in ammonia by the addition of ammonium oxalate.

The calcium glucose-1-phosphate solution did not respond to the conventional reactions of the mineral phosphates nor to those of the aldehydic function of the glucose, which showed that said product did not undergo hydrolysis. Specifically, the calcium glucose-1-phosphate solution did not reduce Fehling solution and did not form a white precipitate of ammonio-magnesia-phosphate upon addition of a mixture of magnesium and ammonia. The calcuim glucose-1-phosphate did exhibit a positive response to glucose reactions due to the presence of several alcoholic functional groups, especially on the periodic oxidation reaction of H.T. Gordon et al. (Anal. Chem. [1956], 28, 849).

Calcium glucose-1-phosphate was completely hydrolyzable in an approximately 1 N acid solution upon boiling for 15 minutes with simultaneous formation of glucose and several phosphates.

Analysis.—$C_6H_{11}O_9PCa$, $2H_2O$; molecular weight= 334.2. Calculated: Ca, 11.99%; P, 9.27%. Found: Ca, 11.95 to 15%; P, 9.26%.

Calcium glucose-1-phosphate is not described in the literature.

Example II.—Preparation of calcium glucose-1-phosphate from potassium glucose-1-phosphate An aqueous solution of 5 gm. of potassium glucose-1-phosphate in 100 cc. was passed by percolation through a column with a height/diameter ratio either equal or higher than 6, and containing 50 cc. of Dowex 1 resin in the acid form. The percolation was effected at a flow of 0.5 volume of solution per volume of resin per hour. The column was then washed with 50 cc. of water which were added to the principal effluent. The resulting solution had a pH value between 1 and 2 and was treated according to Example I to obtain a product identical to that described in the said example.

Example III.—Preparation of calcium glucose-1-phosphate from potassium glucose-1-phosphate An aqueous solution of 10 gm. of potassium glucose-1-phosphate in 200 cc. was passed by percolation through a column containing 120 cc. of Dowex 1 resin in the Cl⁻ form. The percolation was affected at a flow of 0.5 volume of solution per volume of resin per hour and the effluent was eliminated. The column was then washed with 200 cc. of water which also was eliminated. The active material fixed on the ion-exchanger was then eluted by percolation at the same flow rate with 1 N ammonium hydroxide.

The rotary power of the effluent was determined and all optically active fractions were combined and subjected to a vacuum concentration up to half of their original volume to expel all the free ammonia. By polarimetric means, the exact amount of ammonium glucose-1-phosphate in the solution was determined and the calculated stoichiometric amount of calcium chloride was added to the solution. After dissolution of the calcium chloride, two volumes of ethanol were added and the solution was allowed to stand for 24 hours. The precipitate formed was vacuum filtered, washed with ethanol and vacuum dried to obtain a product identical to that described in Example I.

The yield of each of the examples was practically quantitative.

PHARMACOLOGICAL STUDY OF CALCIUM GLUCOSE-1-PHOSPHATE (A) Resistance to fatigue—Swimming test Rats weighing between 300 and 360 gm. were placed in a smooth-walled tank filled with water having a temperature of 30° C. The water level was low enough so that the rats could not contact the rim of the tank with their tails. To force the rats to swim constantly, the water was agitated throughout the test by introducing at the base of the tank a constant and controlled flow of compressed air. The rats were considered exhausted when they sank to the bottom of the tank and no longer had the strength to return to the surface.

Under such conditions, rats are capable of swimming for more than an hour and to reduce the swimming time and to hasten the fatigue of the rats, a weight representing about 6% of the animal's body weight was attached to the tail of each. This reduced the swimming time to about 5 to 6 minutes.

For each test, two groups of 10 rats each were used and their normal swimming time ($T_1$) was determined. After 1½ hours rest, one group of rats received orally the product being tested and the other group served as the control. One hour later or two and a half hours after the first swim test, the swim test was repeated and the swimming time determined was called "time after recuperation" ($T_2$ recuperation). Forty-eight hours after the first test, the experiment was repeated except that the control rats from the first test received the test compound and the treated rats from the first test were the controls. The recuperation time indicated the recuperative powers of the rats and any improvement thereof due to the administration of a defatiguing product.

In Table I, the average $T_1$ and $T_2$ times for calcium glucose-1-phosphate and vitamin C have been grouped together. The difference between $T_1$ and $T_2$ is expressed in percent of increase or decrease and by adding up the variation percentages between the control animals and the treated animals, difference in variation in the recuperating periods and, therefore, the "defatiguing power" of the test compounds was determined. Table I clearly shows that calcium glucose-1-phosphate has a definite defatiguing effect.

TABLE I

| Product administered | Dose, gm./kg. | $T_1$ in seconds | $T_2$ in seconds | Percent of variation | Percent difference in variation |
|---|---|---|---|---|---|
| Controls | | 254.33 | 225 | −11.53 | |
| Calcium glucose-1-phosphate | 0.250 | 236.5 | 236 | − 0.21 | 11.32 |
| Vitamin C | 0.050 | 245 | 253.5 | +3.47 | 15 |

(B) Toxicity determination

The toxicity test was effected on mice of the Rockland strain weighing between 18 and 22 gm. and the product was administered in aqueous solution. The results are summarized in Table II.

TABLE II

| Method of administration | Period of observation in hours | $DL_{50}$ in gm./kg. |
|---|---|---|
| Intravenous | 24 | 1 |
| Intraperitoneal | 48 | 2 |
| Oral | 72 | 2 |

I claim:
1. A method of increasing the resistance of warm-blooded animals to fatigue which comprises administering an effective amount of calcium glucose-1-phosphate to the animals.

2. A method of increasing the resistance of warm-blooded animals to fatigue which comprises administering 1 to 2.5 gm. of calcium glucose-1-phosphate to the animals.

3. A method of increasing the resistance of warm-blooded animals to fatigue which comprises administering orally 1 to 2.5 gm. of calcium glucose-1-phosphate to the animals.

References Cited

UNITED STATES PATENTS 3,114,674  12/1963  Nordmann _____ 167—55

OTHER REFERENCES

Chemical Abstracts 19: 2811–2812 (1925).

ALBERT T. MEYERS, *Primary Examiner.*

J. D. GOLDBERG, *Assistant Examiner.*